United States Patent [19]

Takemura

[11] Patent Number: 4,971,945
[45] Date of Patent: Nov. 20, 1990

[54] SUPERCONDUCTING FREE ELECTRON LASER

[75] Inventor: Yasuhiko Takemura, Atsugi, Japan

[73] Assignee: Semiconductor Energy Laboratory Co., Japan

[21] Appl. No.: 287,069

[22] Filed: Dec. 21, 1988

[30] Foreign Application Priority Data

Dec. 21, 1987 [JP] Japan .................................. 62-321391

[51] Int. Cl.$^5$ .............................................. H01S 3/00
[52] U.S. Cl. .......................................... 505/1; 372/2; 372/37
[58] Field of Search .......................... 372/2, 37; 505/1

[56] References Cited

U.S. PATENT DOCUMENTS 4,542,510 9/1985 Black ........................................ 372/2
4,746,484 5/1988 Jassby ...................................... 372/73

Primary Examiner—Léon Scott, Jr.

[57] ABSTRACT

An improved free electron laser is described. The laser comprises an accelerator arranged in order to emit an electron beam along a laser emission line and a circuit loop including a curved line which traces a periodic function along a line parallel with said laser emission line in order to produce a periodic magnetic field along said laser emission line. The periodical circuit is made of a superconducting material, so that the periodical length thereof is made as short as 100 microns without compromising the strength of the magnetic field induced by the circuit.

4 Claims, 2 Drawing Sheets

SUPERCONDUCTING FREE ELECTRON LASER

BACKGROUND OF THE INVENTION

The present invention relates to superconducting free electron laser.

Free electron lasers are promising devices which can produce coherent and directional radiation at variable wavelengths. The free electron laser can emit laser rays by making use of an electron beam passed through a periodical magnetic field (referred to as "wiggler" for short hereinbelow). Electrons running through a wiggler are waved in accordance with the periodical change of the magnetic field in the wiggler and emit laser rays in phase. The radiation successfully emitted from prior art free electron lasers has been only limited to infrared or millimeter wavelength ranges. The wavelength W of laser rays in accordance with the free electron laser is given by $$W \sim W_0/2r$$

where
 $W_0$ is the periodical length of the wiggler,
 $r = [1-(v/c)^2]^{-\frac{1}{2}}$
 v is the speed of electrons and
 c is the light speed.

In most cases, wigglers are induced by parmanent magnetos and therefore the periodical unit length W is limited to the order of several centimeters. Because of this, when emission of a visible light is desired, it is necessary to accelerate electrons at a very high energy as 100 MeV. Such a high energy requires a very large size accelerator which is inconvenience for industrial and R&D use.

The wavelength of laser rays can be made shorter by use of a wiggler having a shorter periodical unit length. However, the shorter the periodic length is, the lower the magnetic field strength and therefore the emission efficient becomes. At the present, only a maxmum conversion efficient of 40% has been attained while the existence of laser emission have been confirmed at a shortest wavelength of 0.5 micron.

SUMMARY OF THE INVENTION

It is an object of the present invention to provide a free electron laser capable of emitting radiation at short wavelengths.

In order to accomplish the above and other objects, a coil is fabricated from a superconducting oxide material at a short periodical length, e.g. 100 microns or shorter while the magnetic field strength is maintained at a sufficient level required to produce a usable laser beam.

DETAILED DESCRIPTION OF THE PREFERRED EMBODIMENTS

Figure 1:
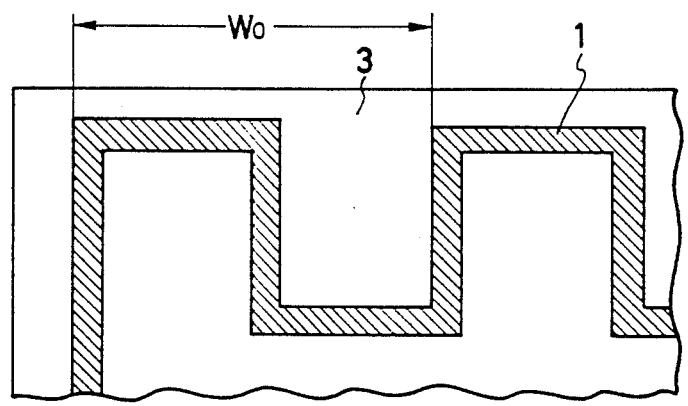
FIG. 1 is a schematic view showing a superconducting coil in accordance with the present invention.

Referring now to FIG. 1, a coil for inducing a wiggler (a periodic magnetic field) is illustrated in accordance with the present invention. The strength B of the magnetic field induced by one turn of the coil as illustrated in FIG. 1 is given by $$B = (\pi \mu_0 I)/a^2$$

where
 I is the current passing through the coil,
 a is the radius of the coil
 $\mu_0$ is the permeability.

In the case of the $Ba_2YCu_3O_7$ type superconducting material, the critical current density Jc not smaller than $10^6$ A/cm$^2$ at 77K can be realized. Accordingly, a superconducting current of 100 A can pass through the coil of the configuration of the above embodiment illustrated in FIG. 1 which induces a magnetic field of about $10^{-2}$ T = 100 Gauss at each turn. When electrons are passed between an aligned pair of the coil at 10 MeV which level is available by a relatively small accelerator, the emission wavelength is as short as 1 micron and therefore the visual light emission becomes possible.

Figure 2:
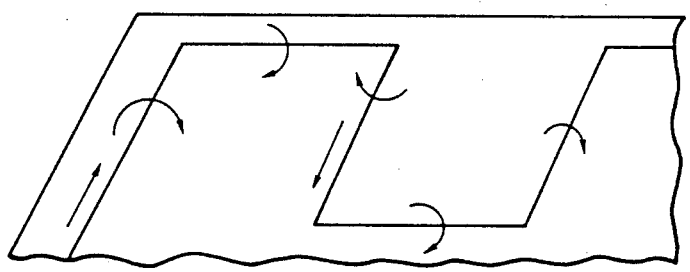
FIG. 2 is an explanatory illustration showing the magnetic field induced by the superconducting coil.
Figure 3:
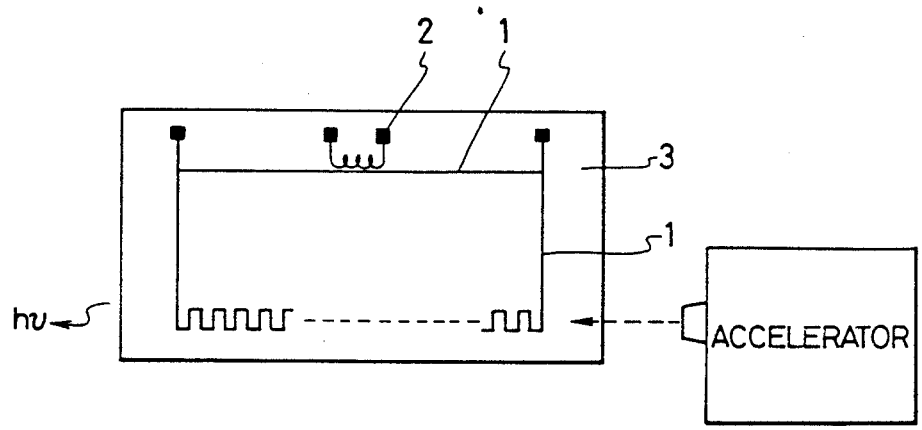
FIG. 3 is a plan view showing a superconducting free electron laser in accordance with the present invention.
Figure 4:
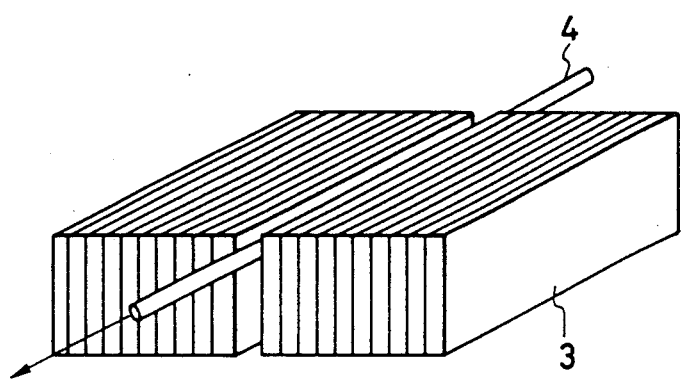
FIG. 4 is a perspective view showing the main portion of a superconducting free electron laser in accordance with the present invention.

The coil is made of a superconducting ceramic of $Ba_2YCu_3O_7$ and formed in the following manner. A ceramic film is deposited on the (100) plane of a single crystalline $SrTiO_3$ substrate of 0.5 mm thickness by a known laser beam evaporation technique using a $Ba_2YCu_3O_7$ ceramic target. The ceramic film is thermal annealed for an hour at 900° C. in an oxigen flow, and gradually cooled. The thickness of the ceramic film is about 100 microns. Then, the ceramic film is subjected to eximer laser scribing in order to produce a pattern 1 including the coil as illustrated in FIG. 1 and FIG. 3. The pattern forms a closed loop 1 from which a pair of input terminals are extended. The square wave form of the coil produces a wiggler (a periodical magnetic field) as schematically illustrated in FIG. 2. Finally, the surface of the structure is covered with a protecting film made of a polymer. A heating coil 2 may be provided for the switching operation of superconducting current. Ten sheets of the coils are laminated in alignment with each other to produce a stronger magnetic field. A vacuum tube 4 is interposed between two laminates of the coils as illustrated in FIG. 4. After the coil assembly is energized and immersed in a nitrogen pool, an electron beam is passed through the vacuum tube 4 which is subjected to a wiggler.

The periodics length Wo, i.e. double the distance between each adjacent vertical lines in the wave form of the coil is 2 mm. The vertical dimmension of the coil is Wo/2. The width of the superconducting line constituting the coil is 100 microns. The pattern is produced by projecting the laser beam which is emitted from a KrF eximer laser (248 nm) and focussed to a cross section of 300 microns × 300 microns by means of an optical system. The portions of the ceramic film can be removed by irradiating three times with a pulsed laser at 0.2 mJ/cm$^2$. While eximer lasers are suitable for this purpose, having regards to accuracy and speed of machining, other lasers are of course usable, e.g. YAG, CO$_2$ and the like. An equivalent coil can be fabricated by spoiling, instead of removing, the portions of the ceramic film also effecting laser irradiation.

In accordance with experiments, microwaves emission at wavelengths of about 100 microns was observed by making use of the device illustrated in FIG. 4 where a superconducting current of 1 A passes through each coil producing 100 Gauss and an electron beam of 1 MeV emitted from an accelerator travells in the tube.

Superconducting ceraics for use in accordance with the present invention also may be prepared in consistence with the stoichiometric formulae $(A_{1-x}B_x)_yCu_zO_w$, where A is one or more elements of Group IIIa of the Periodic Table, e.g. the rare earth elements, B is one or more elements of Group IIa of the Periodic Table, e.g. alkaline earth elements, and $x=0.1-1$; $y=2.0-4.0$, preferably 2.5–3.5; $z=1.0-4.0$, preferably 1.5–3.5; $w=4.0-10.0$, preferably 6.0–8.0. Also, superconducting ceramics for use in accordance with the present invention may be prepared consistent with the stoichiometric formulae $(A_{1-x}B_x)_yCu_zO_w$, where A is one or more elements of Group Vb of the Periodic Table such as Bi, Sb, and As; B is one or more elements of Group IIa of the Periodic Table, e.g. alkaline earth elements, and $x=0.3-1$; $y=2.0-4.0$, preferably 2.5–3.5; $z=1.0-4.0$, preferably 1.5–3.5; $w=4.0-10.0$, preferably 6.0–8.0. Examples of the latter general fomulae are $Bi_4Sr_yCa_3Cu_4O_x$, $Bi_4Sr_yCa_3Cu_4O_x$, $Bi_4Sr_yCa_3Cu_4O_x$ $Bi_4Sr_yCa_3Cu_4O_x$, $Bi_4Sr_yCa_3Cu_4O_x$, $Bi_4Sr_yCa_3Cu_4O_x$ (y is around 1.5).

While several embodiments have been specifically described, it is to be appreciated that the present invention is not limited to the particular examples described and that modifications and variations can be made without departure from the scope of the invention as defined by the append claims. For example, although the example is embodied with the coil configured as shown in FIG. 1, the coil can be formed along a sine curve or other periodic curve drawn about the emission line.

I claim:

1. In a free electron laser emitting radiation at short wavelengths, said free electron laser further including:
   an accelerator means arranged to emit an electron beam along a laser emission line; and
   a superconducting loop including a curved line which traces a periodic function along a line parallel with said laser emission line to produce a periodic magnetic field along said laser emission line.

2. The free electron laser of claim 1 wherein said superconducting loop is made from a ceramic oxide superconducting material.

3. The free electron laser of claim 2 wherein said ceramic oxide superconducting material is $Ba_2YCu_3O_7$.

4. The free electron laser of claim 1 wherein the periodic length is of the order of 100 microns.

* * * * *